UNITED STATES PATENT OFFICE.

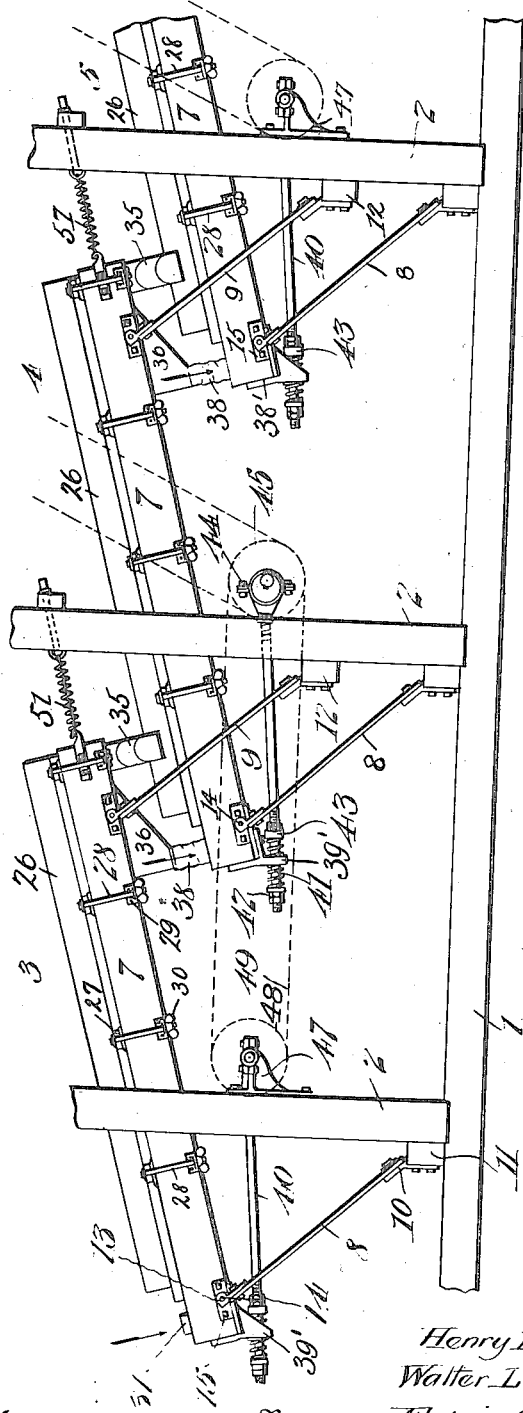

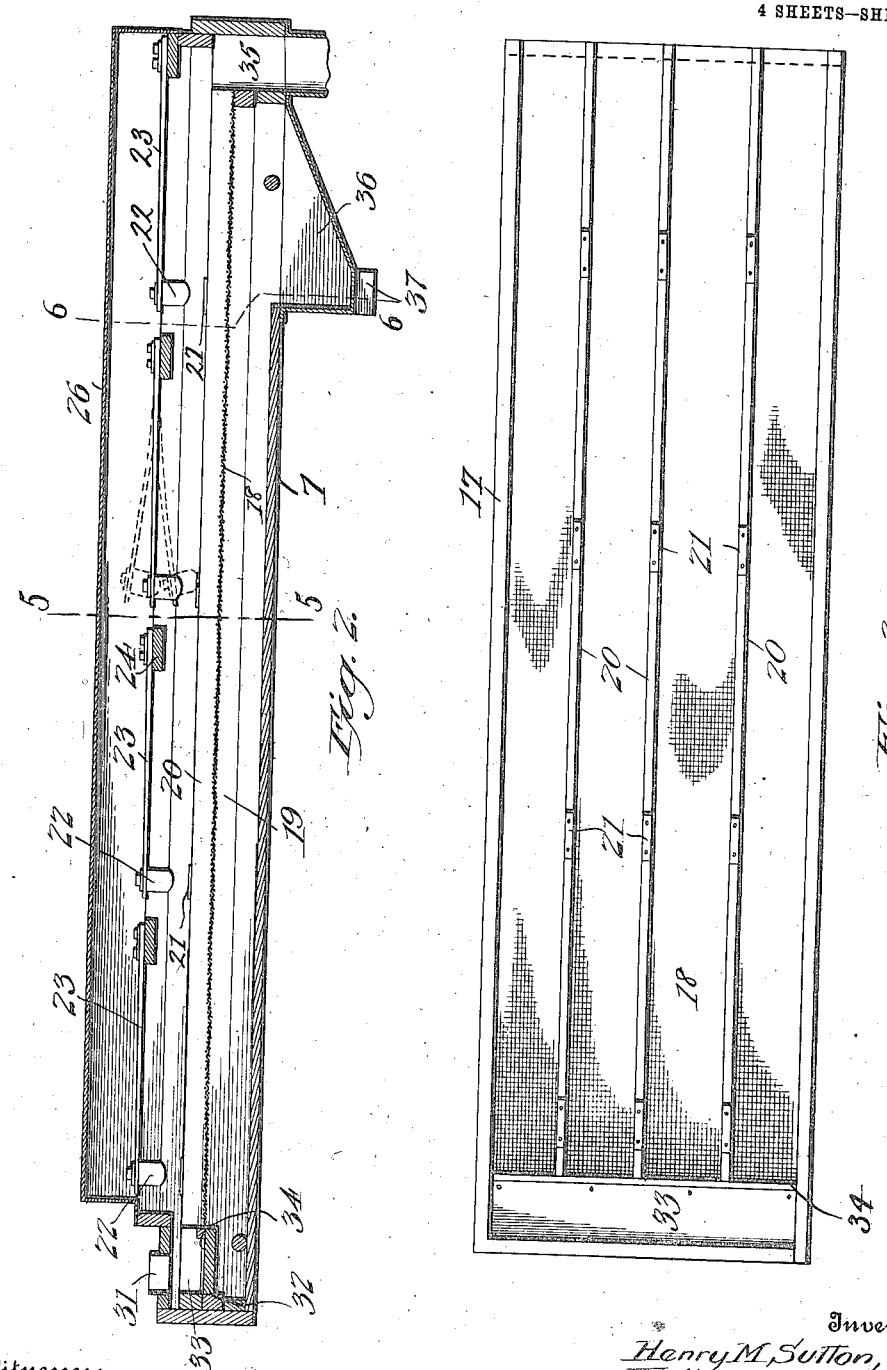

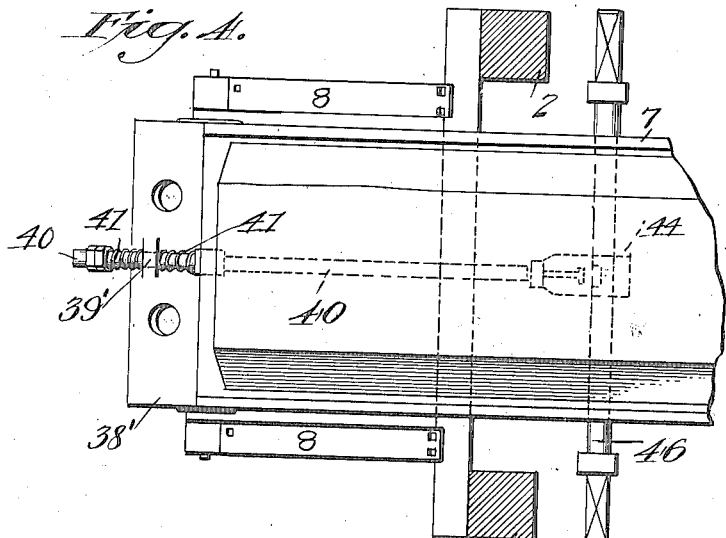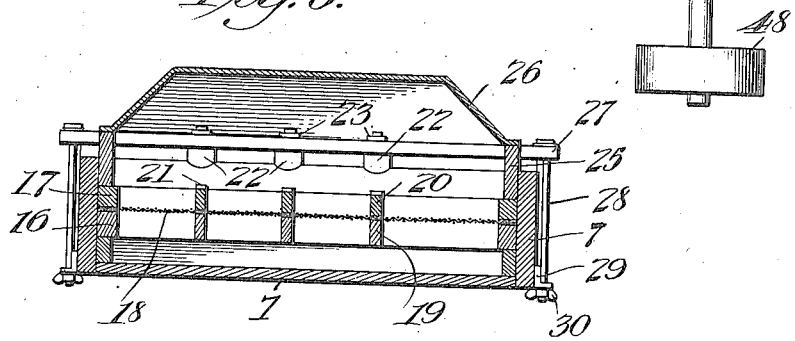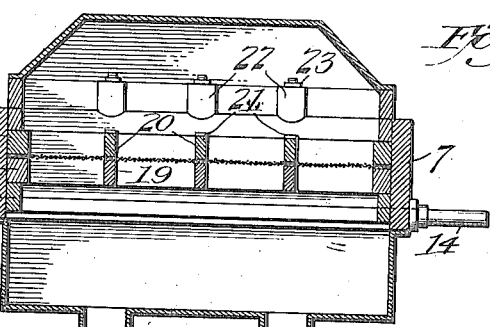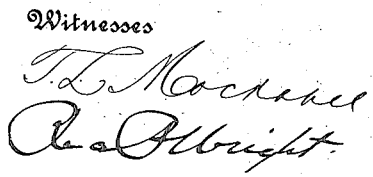

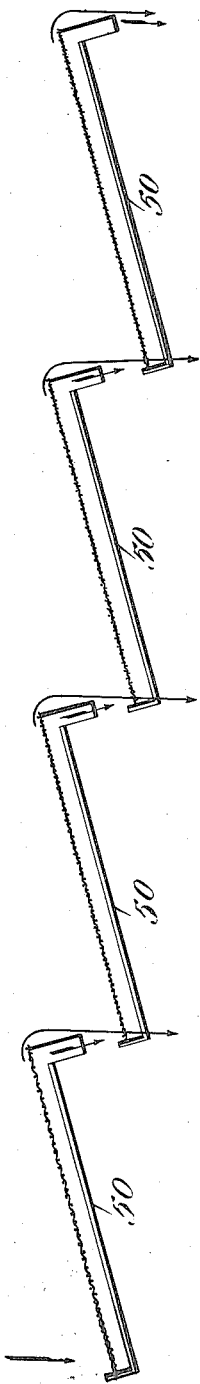
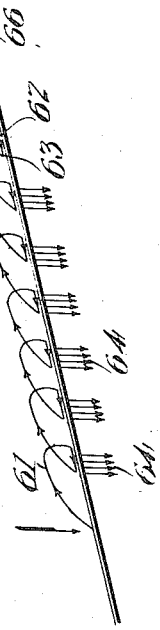
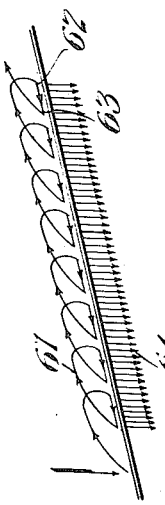
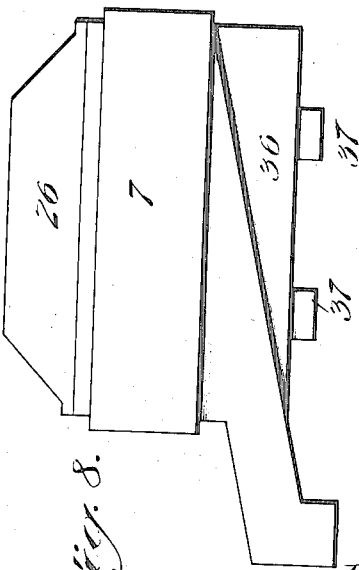

HENRY M. SUTTON, WALTER L. STEELE, AND EDWIN G. STEELE, OF DALLAS, TEXAS.

PROCESS OF AND APPARATUS FOR CLASSIFYING COMMINUTED MATERIAL.

1,136,293.  Specification of Letters Patent.  Patented Apr. 20, 1915.

Application filed August 13, 1913. Serial No. 784,651.

*To all whom it may concern:*

Be it known that we, HENRY M. SUTTON, WALTER L. STEELE, and EDWIN G. STEELE, citizens of the United States, residing at Dallas, in the county of Dallas and State of Texas, have invented certain new and useful Improvements in Processes of and Apparatus for Classifying Comminuted Material, of which the following is a specification, reference being had therein to the accompanying drawing.

This invention relates to certain new and useful improvements in process of and apparatus for classifying comminuted material; the object being to make a practical, perfect sizing in a single passage of the material over a screening surface and thus avoid the cost of frequently rehandling the material. This is accomplished by causing the material to travel up an inclined screening surface by the differential action of said surface and performing the sizing of the material during the travel thereon so as to deliver each finished product therefrom at a higher point than at the point of feed, allowing the unsized products which have passed through the first screen to be delivered to the next succeeding screen of the battery substantially on a level with the original feed, whereby the disadvantages of elevating the screens are dispensed with and the apparatus for carrying out our improved process can be installed in a low shed.

Another object of the invention is to provide an apparatus in which a series of screen units is employed, each screen unit being supported upon springs at an inclination with the feed at the lower end thereof; means being provided for propelling the material fed to the unit upwardly against the force of gravity in short jumps; the material being allowed to move intermittently by gravity down the inclined screening surface in order to cause the pulverulent material thereof to pass through the screen into the screen beds in which it is propelled upwardly and is delivered to the next screen unit of the series; the larger particles being discharged at the upper end of the screen unit into a suitable receptacle.

Another and further object of the invention is to provide a screening apparatus which is divided into a number of screening surfaces in order to avoid the excessive vibration of a larger screening surface at a point midway between the supports thereof so as to avoid the different speeds of travel of the material as a screening surface of any width which is only supported at its marginal edges, vibrates greater at the center than at the edges thereof which causes the material thereof to travel faster at that point than along the edges thereof, but by subdividing the screening surface, the movement of the material down the inclined screening surface by gravity, is substantially uniform.

Another object of the invention is to provide means for agitating or vibrating the screening surfaces on one of their movements in order to cause the material to be agitated so as to pass through the surface in order to prevent the openings thereof from becoming clogged.

Another and further object of the invention is to provide novel means for propelling the material up the inclined screening surface through the medium of eccentrics which are yieldingly connected to the screen bed of each unit in order to form a cushion for the stroke of the eccentric rod.

Another and further object of the invention is to mount the screen beds upon springs arranged at different elevations at the respective ends thereof to cause the material thereon to be propelled or pitched in the direction of inclination of the bed by the reciprocation thereof so as to advance the material in short jumps interrupted by stationary intervals in which the material gravitates in a reverse direction from the propelling movement to allow the same to pass through the openings of the screen.

It is well-known to those skilled in the art of ore dressing, that before any granular ore or other material consisting of particles of slight differences in specific gravity, can be successfully separated into its constituent elements by means of any form of concentrating apparatus whether the separating agency used in such concentrating apparatus be air, water, electro-magnetism or static electricity, the ore must be first classified into separate masses of particles, each mass containing particles of approximately the same size.

The fundamental principle of our invention is to provide a process of and an apparatus for classifying comminuted material which will reduce the wear on the screening cloth greatly in order that low grade ore can be sized at a profit.

Other and further objects and advantages of the invention will be hereinafter set forth and the novel features thereof defined by the appended claims.

In the drawings—Figure 1, is a side elevation of one form of apparatus for carrying out our improved process of classifying comminuted material; Fig. 2, is a longitudinal vertical section through the screen bed and screen, constituting one of the screening units of the battery; Fig. 3, is a top plan view of one of the screen frames; Fig. 4, is a top plan view of the feed end of one of the screening units; Fig. 5, is a section taken on the line 5—5 of Fig. 2; Fig. 6, is a section taken on the line 6—6 of Fig. 2; Fig. 7, is a detail enlarged section through one of the superposed ribs of the screening surface showing the manner of fastening the two ribs together over the screen; the upper rib forming separating means for the screening surface so as to divide the same into a number of screening surfaces in order to reduce the vibration to a minimum so as to overcome the effect thereof on the particles of the mass; Fig. 8, is an enlarged end elevation of the discharge end of one of the screening units; Fig. 9, is a diagrammatic view showing the battery of four screening units instead of three, as shown in Fig. 1; Fig. 10, is a diagram illustrating the jumping movement of the material on the screening surface when being propelled against the force of gravity up the inclination thereof; and Fig. 11, is a similar view showing the movement of the material when the propelling movement of the screening cloth is adjusted so as to allow the particles to slide by gravity, to a greater extent than that shown in Fig. 10.

Like numerals of reference refer to like parts in the several figures of the drawings.

In the drawings, we have shown one form of apparatus for carrying out our improved process of classifying comminuted material which comprises a pair of longitudinally arranged base timbers 1 having a series of standards 2 arranged in pairs between which are mounted screening units 3, 4 and 5 herein shown three in number, but it is of course understood that any desired number of screening units can be employed to meet the demand and we do not wish to limit ourselves to any number of screening units, the fundamental principle being to provide a series of screening units arranged at an incline with the feed of each unit substantially in the same horizontal plane in order to avoid the elevating of the upper screening unit in gravity screens now in use.

The screening units employed in the form of apparatus herein shown, are identical in construction and the description of one will be sufficient for all.

Arranged between each pair of uprights 2 is a screen bed 7 of any desired configuration, preferably in the form of an oblong box supported by springs 8 and 9 at an inclination, the springs 8 being carried by brackets 10 fixed to cross beams 11 and the springs 9 carried by similar brackets fixed to cross beams 12 arranged in a horizontal plane above the beams 11 so as to throw the screen bed to the desired inclination. It will be noted that the springs 9 are connected to the cross beams 12 at a considerably higher elevation than those of the springs 8; the object being to raise the discharge end of a screen bed above the level of the feed end so as to deliver the material that is to be further sized, or the smaller particles to the next succeeding screen on substantially the same level as the original feed. It will be noted that the springs 9 are set at a greater angle than the inclination of the screen bed so that when actuated as will be hereinafter described, the beds are given a motion which causes them to rise on the forward stroke and recede on the return stroke so as to cause the pulverulent material delivered into the bed to travel up the inclination and pass through the discharge opening thereof. The upper ends of the springs 8 and 9 carry bearings 13 which are pivotally mounted on studs 14 carried by brackets 15 secured to the screen bed as clearly shown, and while in the drawings, we have only shown two of these springs, it is, of course, understood that these springs are arranged in pairs at each end of the bed in order to support the same firmly in such a manner that the same can be reciprocated to produce the desired movement of the material thereon.

Arranged above the screen bed and spaced from the solid bottom thereof, is a pair of superposed screen frames 16 and 17 between which is arranged a screen 18 which is secured to the lower frame 16 around its marginal edge by suitable fastening means such as tacks and the like in order to securely fasten the same thereto. The frames 16 and 17 are provided with longitudinal ribs 19 and 20 superposed as clearly shown, dividing the screening cloth into a number of compartments; said superposed ribs being secured together over the screening cloth preferably by screws as shown in Fig. 7 so as to firmly bind the cloth between the ribs in order to prevent the same from vibrating to any extent.

The upper ribs of the upper frame 17 are provided with suitable anvils 21 adapted to be engaged by hammers 22 carried by springs 23 which are preferably formed of wood and are carried by cross bars 24 of a cover frame 25 arranged upon the frame 17 within the box-like screen bed. These hammers are actuated by the movement of the screen bed so that when the bed is moved on its forward stroke, they will be brought into contact with the anvils located on the ribs 20 so as to tap the frames on the forward stroke only and remain idle on the return stroke. These hammers are so weighted in proportion to the springs 23 that when the screen is in operation, they will be brought into contact with the anvils at the end of the forward stroke; it of course being understood that this can be varied to a considerable extent by changing the number of strokes per minute at which the screen bed is operated and by the strength of the springs 23 in relation to the hammers 22.

In order to render the screen beds dustproof when in operation, the cover frames 25 are provided with hoods 26 preferably formed of metal which completely incloses the cover frames which in turn closes the screen beds so as to prevent the escape of any dust. The cross bars 24 of the cover frames 25 are provided with extended ends 27 which are bifurcated and in which are mounted bolts 28; the lower ends of which extend through eyes 29 and are provided with wing nuts 30 for clamping the cover frame firmly in position upon the screen bed which in turn holds the screen frame in its proper position within the box-like bed.

The bed is provided with spaced receiving spouts 31 through which the comminuted material passes from the hopper not shown, onto a cushioning bed 32 preferably formed of rubber arranged within the receiving chamber 33 which is provided with a baffle cleat 34 extending entirely across the width of the frame so as to temporarily obstruct the travel of the pulverulent material until it has accumulated sufficiently to flow over the same in an even sheet so as to be distributed evenly onto the screen which is a very essential feature in the working of the screen. The cushioning bed 32 prevents the wear from the pulverulent mass falling through the receiving spout to the receiving chamber.

As the material is received in the receiving chamber 33 and accumulates, the propelling movement of the bed causes the same to pass over the baffle cleat 34 in a fine stream onto the screen between the dividing ribs. It is divided into two classes of particles, those which are too large to pass through the opening of the screen and those which pass through the openings thereof. The upper end of the screen bed is provided with a discharge spout 35 which extends laterally, and from which the particles remaining on the top of the screening surface are discharged into suitable receptacles. The bed is provided with a delivery hopper 36 at its upper end having discharge spouts 37 which are connected by a flexible hose as shown at 38 to the receiving spout 31 of the next screening unit and through which the particles of pulverulent material of the mass which has passed through the screening surface of the first screening unit are delivered to the receiving chamber of the second unit. The screening units are provided with screening cloths of different meshes which progressively decrease in mesh from the lower to the upper unit. As an example the screening second unit will have smaller openings than the first unit, consequently, the small particles delivered from the first unit which have passed through the screening cloth thereof will have a certain amount of particles which will be too large to pass through the openings of the screening cloth of the second unit and these particles will be discharged through the discharge spout 35 and this operation is repeated with the next screening units and as many units can be added as will be necessary to make the desired number of sized products.

It will be noted that the granular pulp travels up the inclined surface of each screening unit against the force of gravity. This is made possible by the pushing action of the screening surface on the pulp caused by the proper inclination of the supporting springs which when the bed is reciprocated, gives a pitching action to the pulp by which it advances up the inclination of the screening surface by a series of short jumps and this movement of the material is one of the fundamental principles upon which the process of classifying particles of comminuted material in accordance with our invention, depends.

The pulverulent material which passes through the screen in the movement of the material upwardly thereon against the force of gravity, is caught by the bed of the box-like screening bed and by the propelling movement of the bed is carried upwardly thereon until it reaches the discharge hopper 36 where it falls by gravity through the discharge spout 37 into the feed spout of the next screening unit. It will be seen that each screening unit performs a classification of the material, inasmuch as the particles which fail to pass through the screening cloth are discharged from each screening unit which are of a certain-sized classified product, as by having the mesh of the cloth such a size that substantially all of the particles with the exception of the extra large particles will pass through the same. The large particles will be the only ones sized by the first unit, and by changing the mesh of the screening surfaces of the respective units, the same process of classifying material will be carried out.

In order to provide means for reciprocating the screening units in order to cause the material to be moved up the inclination thereof in jumps, we provide each unit with a bracket 38' at its feed end having a lug 39' through which extends an eccentric or pitman rod 40 provided with coil springs 41 to each side of the lug which springs are held in position by nuts and washers 42 and 43 in order to cushion the stroke of the pitman. The opposite ends of the pitman rod 40 are provided with an eccentric strap 44 which embraces an eccentric 45 fixed on a shaft 46 mounted in suitable bearings or brackets 47 fixed to the uprights 2 and said shaft 46 is provided with a pulley 48 over which driving belts 49 are adapted to pass and these driving shafts can be connected up in a series or each one separately to a suitable source of power in order to drive the shafts at a uniform rate of speed. By this manner of connecting the pitman rods operated by the eccentrics to the screen beds, the stress on the eccentric at each end of the stroke is relieved as on the forward stroke one of the springs is compressed while on the return stroke, the opposite spring is compressed.

In order that the movement of the material up the inclined surface can be clearly understood, the diagrams illustrated in Figs. 10 and 11 show the movement thereof and in these figures, 66 represents the screening surfaces, the curved lines 61 show the travel of the pulp and it will be noted that when the pulp is thrown forward on the upward stroke of the screen that after alighting on the screen surface it travels by gravity a short distance down the inclination of the same, the propelling movement being greater than the travel of the material by gravity so as to prevent the same from traveling back to the original starting point. When the particles come into contact with the screen after being thrown upwardly and during the sliding movement downward by gravity, the smaller particles 64—64 pass through the openings of the screen and various modifications to this action can be made through varying the length of the stroke of the eccentrics or the number of strokes delivered in a given time, or both. For instance in Fig. 11, we have a long and a slower stroke of the eccentric where the particles have a longer movement or slide by gravity downward between each stroke of the eccentric and it will be noted from the above description, that the pulp is turned over frequently in its travel up the inclined screening surface so that every particle of the pulp is brought into contact with the screening surface and this affords an opportunity for the finer particles of the pulp to pass through the openings in the screen and where these screens are to be used to actually size ore pulp as a preparatory process for subsequent separation upon any of the well-known forms of specific gravity table, the advance in the art is at once apparent.

In the form of apparatus shown in Fig. 9, we show a battery of four screening units 50 through which the comminuted material is adapted to be passed in order to carry out the process of classifying the material, and while we have shown only an apparatus with four units, any number of units can be employed to meet the requirements of the ore being classified as we do not wish to limit ourselves to the number of units, as it is only necessary to arrange the units in series to carry out the process of classification.

The operation of the apparatus in classifying comminuted material in order to carry out the process of sizing the particles in order that they can be separated effectively upon a separating table, is as follows: The pulverulent mass of particles to be sized is delivered from a suitable hopper or bin through the receiving spout into the receiving chamber onto the cushioning bed of rubber which is located on the bottom of the receiving chamber. Supposing that the screen is in motion, the pulverulent material is thrown against the baffle cleat which extends entirely across the width of the frame which temporarily obstructs the travel of the pulverulent mass until it has accumulated sufficiently to travel in an even sheet onto the screen.

As the screen surface is divided into a number of screening surfaces in order to prevent the same from vibrating to any extent, the mass of particles which passes over the baffle cleat in a fine stream is delivered upon this screening surface and at once a separation takes place inasmuch as the finer particles pass through the screen onto the bed of the screen bed. The particles of larger size which fail to pass through the screen at this point, are propelled upwardly thereon against the force of gravity intermittently and between the intervals of propelling movement they travel backwardly down the inclined surface, it of course being understood that the hammers are in operation during this movement so as to vibrate the screen which causes the particles to travel uniformly down the incline and at the same time any particles of the mass of a smaller size than the mesh of the screen pass through the screen into the bed and this operation is repeated until the particles are moved or propelled in short jumps up the inclined screen until they reach the discharge spout from which they are discharged into the suitable receptacles.

The mass of pulverulent material which is of a smaller size than the mesh of the screen and which passes through the screen, is at the same time being propelled upwardly on the bottom of the bed and is delivered into the discharge hopper at the upper end thereof from which it is conveyed by the flexible pipe to the next screening unit where the same goes through the same operation, it of course being understood that the screen of the next unit is of smaller mesh than the screen of the first unit and by continuing this operation through a number of units, a perfect sizing can be obtained.

The screen beds 7 are preferably connected to the standards 2 by coil springs 51 as clearly shown in Fig. 1, in order to aid the eccentrics in moving the beds so as to impart thereto, a jump-like movement to the material in its travel up the screening surface against the force of gravity.

It will be noted that in the construction of apparatus herein shown, the receiving chamber 33 is formed at one end of the upper screen frame 17 as clearly shown in Fig. 3 and the other end of said screen frame is open or the end bar is omitted in order to allow the larger particles of the comminuted material which have been propelled upwardly upon the screening surface to be discharged into the delivery spout 35.

When the mass is delivered into the receiving chamber 33 the baffle cleat 34 forming one of the walls of the receiving chamber, allows the material to accumulate within the receiving chamber until the same has reached such a height that the same will overflow the cleat and as the bed is being reciprocated, the material within the receiving chamber is propelled over the baffle cleat in a thin sheet and deposited upon the screening surface 18 where the initial separation takes place.

While we have shown and described this particular construction of receiving chamber for the screen unit, it is of course understood that the chamber can be a separate and distinct one from the screen bed and that various other forms of screen chamber can be used without departing from the spirit of our invention; the essential feature of the receiving chamber, being to discharge the mass from the receiving chamber into a fine sheet upon the screening surface.

From the foregoing description, it will be seen that we have provided an apparatus for classifying comminuted material upon which a process of sizing particles can be carried out in such a manner as to thoroughly size the mass at a very low cost and while we have shown a particular form of apparatus for carrying out this process, it is of course understood that various other forms of apparatus may be employed without departing from the spirit of our invention; the fundamental principle of which is to propel a mass up an inclined screening surface intermittingly in order to allow the mass to recede by gravity so that the smaller particles in their downward movement will pass through the screening surface and by arranging a number of these screening members in a series or battery, the material can be thoroughly sized, as each unit will deliver the large particles delivered thereto according to the size of mesh at the upper end thereof; the smaller particles being conveyed to the adjacent screening unit where they are subjected to a similar screening process.

We claim:

1. The process of classifying a mass of material, consisting in imparting projecting pulsation to the material upon an inclined reticulated supporting surface against the force of gravity to cause the particles to move intermittently by gravity, and separately collecting the thus classified particles.

2. The process of classifying comminuted material, which consists in imparting intermittently thereto, a projecting movement upon an inclined reticulated surface against the force of gravity separated by inactive projecting movements to allow the particles to recede by gravity, and separately collecting the thus classified particles.

3. The process of classifying a mass of material, consisting in supporting the material upon a reticulated supporting surface and imparting movement thereto by the force of gravity and projecting pulsations in opposite directions at different times, to cause the material to advance upon said reticulated surface in a step-like movement.

4. The process of classifying a mass of comminuted material, consisting in intermittently moving said material upon an inclined supporting reticulated surface by projecting pulsations, subjecting said material in the intervals between said movement to the force of gravity, to cause the mass to recede upon said surface to allow the smaller particles thereof to pass through said reticulated surface, and separately collecting the thus classified particles.

5. The process of classifying a mass of material, consisting in imparting projecting pulsations to the material while supported upon an inclined reticulated surface to cause the particles thereof to intermittently advance against the force of gravity to intermittently recede by the force of gravity upon said surface, and separately collecting the thus classified particles.

6. The process of classifying a mass of material, consisting in feeding and intermittently moving said material upon an inclined reticulated surface by a series of projecting pulsations, to cause the material to move upon said surface against the force of gravity and to recede upon said surface by the force of gravity at intervals, and separately collecting the thus classified particles.

7. The process of classifying a mass of particles, consisting in imparting projecting pulsations to said material upon an inclined reticulated supporting surface to intermittently advance said material upon said surface against the force of gravity, causing said material to recede by the force of gravity between said intermittent advancement, to cause the smaller particles thereof to pass through said reticulated surface, and separately collecting the thus classified particles.

8. The process of classifying a mass of comminuted material, consisting in feeding said material upon the lower end of an inclined reticulated screening surface, intermittently projecting said material upon said screening surface against the force of gravity, intermittently allowing said material to recede upon said surface by the force of gravity, and separately collecting the thus classified particles from said surface.

9. The process of classifying a mass of comminuted material, consisting in feeding said material upon an inclined screening surface, to cause an initial separation thereof, advancing said mass intermittently upon said screening surface against the force of gravity, intermittently allowing said particles to recede between said advancements by the force of gravity, to cause the smaller particles to pass through said screen, and collecting the larger particles from the upper end of said screening surface.

10. The process of classifying comminuted material, consisting in projecting the mass against the force of gravity upon an inclined screening surface to cause the particles thereon to advance intermittently against the force of gravity and to recede intermittently by the force of gravity to cause the separation of said particles in the movement of said material upon said screening surface, and separately collecting the thus classified particles.

11. The process of classifying comminuted material, consisting in feeding said material upon the lower end of an inclined screening surface, projecting said material upwardly over said surface against the force of gravity intermittently, intermittently allowing the material upon said surface to recede thereon by the force of gravity, and collecting the oversized particles from the upper end of said screening surface.

12. The process of classifying material, consisting in intermittently projecting said material against the force of gravity upon an inclined screening surface, intermittently allowing said material to recede upon said surface by the force of gravity, and separately collecting the thus classified particles.

13. The process of classifying material, consisting in feeding the unsized particles thereof upon an inclined screening surface, projecting said particles upon said surface intermittently against the force of gravity, vibrating said screening surface to cause the particles thereof to recede by the force of gravity upon said surface intermittently to allow the smaller particles thereof to pass through said surface, and collecting the larger particles from the upper end of said screening surface.

14. The process of classifying comminuted material, consisting in feeding the mass of material to the lower end of an inclined intermittently vibrating screening surface, intermittently projecting said material against the force of gravity upon said screening surface, intermittently allowing said material to recede upon said surface by the force of gravity to allow the particles thereof to move in a reverse direction, and collecting the larger particles from the upper end of said screening surface.

15. The process of classifying comminuted material, consisting in intermittently imparting a propelling movement to the mass upon an inclined screening surface, vibrating said screening surface, subjecting said material to the force of gravity to cause the material to move in a reverse direction from the propelling movement, to cause the finer particles thereof to pass through said screening surface, and collecting the larger particles projected over the upper end of said screening surface.

16. An apparatus for classifying solid material, comprising a longitudinally inclined screening bed, inclined springs for supporting said bed, a screen arranged within said bed, a discharge spout arranged at the upper end of said screen, a receiving chamber formed at the lower end of said bed, means for intermittently reciprocating said bed to cause the bed to rise on its forward movement and recede on its return movement to advance the material upon said screen, means for vibrating said screen to cause the material to recede upon said screen, and means for separately collecting the different sized particles.

17. A screening apparatus for sizing solid material, comprising a spring-supported longitudinally inclined bed, a screen arranged within said bed, means for intermittently reciprocating said bed to cause the bed to rise on its forward stroke and to recede on its return stroke to advance the material upon said bed, means for vibrating said screen to cause the material to recede upon said screen, and means for discharging the different sized particles from the upper end of said bed.

18. An apparatus for classifying comminuted material, comprising an inclined spring-supported screen bed, said bed being provided with a discharge at its upper end and a receiving chamber at its lower end, a screening surface arranged within said screening bed, a cover for said bed, means for intermittently reciprocating said bed to cause the bed to rise on its forward stroke and to recede on its return stroke for advancing the material upon said screen intermittently, means for vibrating said screen to cause the material to recede upon said surface intermittently, and means for separately discharging from the upper end of said bed, the different sized particles.

19. An apparatus for classifying comminuted material, comprising a base, standards arranged between said base, obliquely arranged springs carried by said standards in different planes, a screen bed supported upon an incline by said springs, said screen bed being provided with a feed chamber at its lower end and a discharge at its upper end, means for intermittently reciprocating said screen bed, and means for collecting the classified particles discharged from the upper end of said bed.

20. An apparatus for classifying comminuted material, comprising an oblong boxlike screen bed, having a discharge at its upper end and a receiving chamber at its lower end, a baffle arranged across said receiving chamber, a screening surface arranged within said bed below the plane of said baffle, a discharge from the upper end of said screening surface, obliquely arranged springs having a pivotal connection with said bed for supporting the same at an incline, and means for intermittently reciprocating said screen bed.

21. An apparatus for classifying comminuted material, comprising a spring-supported longitudinally inclined screen bed having a discharge at its upper end and a receiving chamber at its lower end, a screening surface arranged in said bed below said receiving chamber, a discharge from the upper end of said screening surface, means for intermittently reciprocating said screen bed to cause the bed to rise on its forward stroke and to recede on its return stroke to cause the comminuted material delivered from the receiving chamber to be intermittently projected upwardly over said surface, means for vibrating said screening surface to cause the material to intermittently recede upon said surface, and means for separately collecting the different sized particles discharged from the upper end of said screen bed.

22. An apparatus for classifying comminuted material, comprising a base provided with spaced standards, obliquely arranged springs extending upwardly and rearwardly from said base, an oblong box-like spring bed pivotally mounted upon said springs, a spring connecting said bed to said standards, a screen arranged within said bed, said bed being provided with a delivery hopper at its upper end having discharge spouts, a discharge spout extending from the upper end of said screen, means for intermittently reciprocating said screen bed to cause the bed to rise on its forward stroke and to recede on its return stroke to cause the comminuted material delivered thereon to be intermittently advanced upon said screen, and means for vibrating said screen to cause the material to recede upon said surface intermittently.

23. An apparatus for sizing solid material, comprising a reticulated longitudinally inclined supporting surface, means for feeding material upon the lower end of said surface, means for projecting said material intermittently upon said surface for advancing the material against the force of gravity, means for vibrating said surface to allow the mass to recede by the force of gravity intermittently, means for discharging oversized particles from the upper end of said surface, and means for collecting the undersized material.

24. An apparatus for sizing solid material, comprising a reticulated longitudinally inclined spring-supported surface, means for feeding unsized material upon the lower end of said surface, means for projecting said material intermittently upon said surface against the force of gravity for advancing the material thereon intermittently, means for vibrating said surface to cause the material to recede intermittently by the force of gravity, and means for collecting the different sized material discharged from said surface.

In testimony whereof we affix our signatures in presence of two witnesses.

HENRY M. SUTTON.
WALTER L. STEELE.
EDWIN G. STEELE.

Witnesses:
W. T. HURT,
B. E. CROFTS.